May 17, 1949.  
C. W. MOTT  
2,470,221  
APPARATUS FOR AND METHOD OF DRESSING CYLINDRICAL SURFACES  
Filed April 2, 1945

Inventor:
Carl W. Mott
By: Paul O. Pippel
Atty.

Patented May 17, 1949

2,470,221

UNITED STATES PATENT OFFICE 2,470,221

APPARATUS FOR AND METHOD OF DRESSING CYLINDRICAL SURFACES

Carl W. Mott, La Grange, Ill., assignor to International Harvester Company, a corporation of New Jersey Application April 2, 1945, Serial No. 586,182

3 Claims. (Cl. 51—261)

This invention relates to the art of abrading or dressing cylindrical surfaces of bodies to smooth, grind or polish the same, and particularly concerns an apparatus and method involving rotation of a body about the principal axis of its cylindrical surface during the impression of a rotating dressing structure radially against a circumferential portion of such surface and concurrent relative translation of the rotating structure and body axially of such surface.

The general object of this invention is the provision of a process and simple apparatus serviceable to quickly perform grinding, polishing or honing operations heretofore accomplished by costly precision-built machines.

It it thought the more specific objects will be more easily and fully comprehended from the ensuing description and the annexed drawing, wherein.

Figure 1:
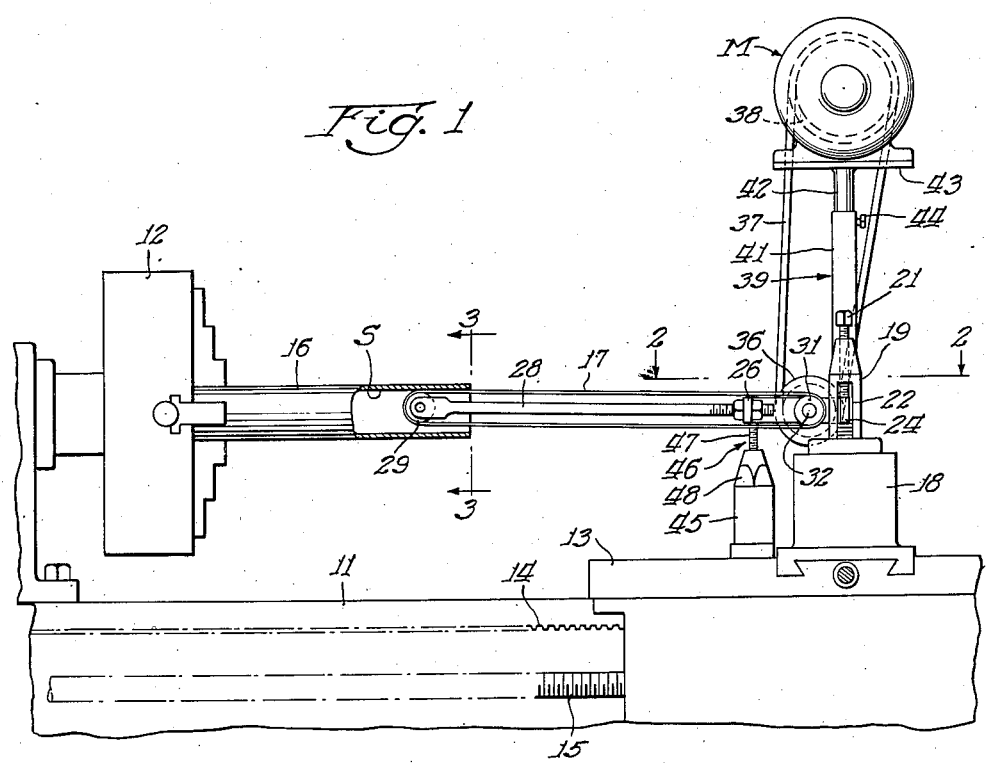
Figure 1 is a side elevational view of apparatus constructed according to the principles of this invention together with an article being worked upon by the apparatus and shown partially in section.

In the present form of the apparatus, certain parts of a conventional turning lathe are employed. In Figure 1 the bed of such lathe is designated 11, the chuck thereof is designated 12 and the tool carriage of such lathe is designated 13. In the operation of the apparatus the carriage 13 is reciprocated horizontally from left to right and right to left upon the bed 11. Such reciprocation or excursive movement of the carriage 13 may be produced by the manual control (not shown) utilizing a pinion cooperative with a gear toothed rack 14 fixed to the bed 11. The carriage 13 may also be reciprocated by the use of a rotating lead-screw 15 cooperative with threaded parts, not shown, mounted on the carriage 13. The body having a cylindrical surface to be dressed by the apparatus is a cylindrical body 16 of metal tubing or the like and is held conventionally in the chuck 12 for rotation coaxially therewith in the usual manner that work pieces are associated with a chuck.

Figure 3:
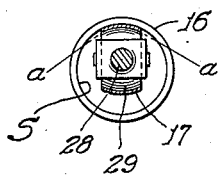
Figure 3 is a vertical sectional view taken on the line 3—3 of Figure 1, showing the cylindrical article being worked upon and illustrating the contour of a rotatable dressing structure of the apparatus in contact with the cylindrical surface of said article or body.

Parts for carrying and rotating a dressing structure in the form of an abrasive belt 17 are mounted upon the carriage 13. Carriage 13 has the usual tool-holder 18 thereon with the slotted head 19 and a set-screw 21 rotatable to project downwardly into a slot 22 in the head 19. A base structure 23, Figures 1 and 2, comprises a horizontal leg 24 shaped similarly to the shank of a conventional metal-cutting tool and projects into the slot 22 where it is retained by the set-screw 21. A second leg, 25, of the base structure 23 has a laterally turned end portion 26 apertured to receive a threaded end 27 of an arm 28. This arm 28 carries a roller 29 on the outer end thereof which projects toward the chuck 12. Roller 29 which constitutes one counterpart of supporting means for the rotatable dressing structure 17 is rotatable about an axis extending transversely of the axis of the cylindrical surface S which is to be operated upon by the apparatus. The axial surface elements a—a of the belt-engaging circumferential periphery of said roller are curved or arched convexly, as illustrated in Figure 3, to conform substantially to the circumferential curvature of the surface S within the cylindrical body 16. Also it is ascertainable from Figure 3 that the reaching end portion of the arm 28, the belt carrying counterpart or pulley 29 thereon, and the parts rotatively supporting the pulley are confined within a space embraced by continuation extensions of diametrically opposite curved axial surface elements of such pulley within a plane perpendicular to the arm. This assures that only the dressing belt will engage any internal cylindrical surface into which the arm 28 is endwise projectable. The other counterpart for carrying the belt or rotatable dressing structure 17 consists of a roller 31 constrained for rotation with a shaft 32 journaled within a bearing 33 carried by the base leg 25. After the belt 17 has been placed upon the rollers 29 and 31 the tautness of the belt can be adjusted by means of the nuts 34 and 35 upon the threaded portion 27 of the arm 28 at opposite sides of the laterally turned portion 26 of the base leg 25. Also the roller 31, as viewed in Figure 2, has a circumferential profile arched axially thereof similarly to the roller 29.

Shaft 32 is rotated by a belt pulley 36 which receives power from an electric motor M through a belt 37 which is carried upon said pulley 36 and a pulley 38 constrained for rotation with the motor armature. The motor M is carried upon a vertical standard 39 of which the outer part 41 thereof projects upwardly from the base 23 for the telescopic reception of a part 42 having a mounting plate 43 at its upper end for the base of the motor. A set-screw 44 in the tubular portion 41 of the standard 39 maintains selected distension of the telescope structure 41—42 and the tautness of the driving belt 37.

Figure 2:
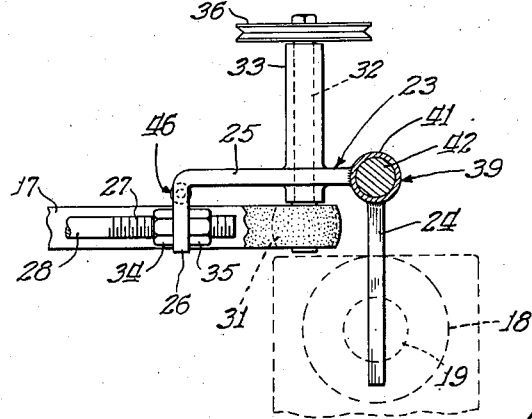
Figure 2 is a horizontal sectional view taken on the line 2—2 of Figure 1.

A device for pushing the outer end of the arm 28 upwardly and for thereby regulating the amount of pressure between the belt 17 and the cylindrical surface S of body 16 comprises a base member 45. A vertical stem 46 has a threaded portion 47 projecting upwardly from the base 45 and a polygonal section (not shown) contained within the base and axially slidable within a mating portion (not shown) of the base for preventing rotation of said member 46. A cap 48 rotatable upon the upper end of the base 45 is internally threaded to mesh with the threaded portion 47 of the stem 46 and is thereby adapted to adjust the axial position of said stem of which the upper end bears against the underside of the leg 25 as illustrated in Figure 2.

*Operation of the apparatus*

As an example use of the machine, the cylindrical body 16 may be assumed to be a length of unfinished steel tubing from which it is desired to form the cylinder of a hydraulic motor. The apparatus is for reaming, honing or polishing the inner periphery of the body 16 so that such surface will possess the desired smoothness for establishing a sealing fit with a piston reciprocable therein.

Prior to attaching the cylindrical piece 16 into the chuck 12, the carriage 13 will have been in a position to the right of that illustrated in Figure 1 so there will be ample clearance between the roller 29 and the right end of the body or piece 16 and thereby not interfere with the manipulation of the piece 16 when mounting the same. Subsequent to mounting the piece 16, the electric motor M will be started, causing rotation of the dressing structure or belt structure 17 and the carriage 13 will be moved to the left for causing the projecting end of the arm 28, the belt roller 29 and the belt to enter the body 16 endwise. When series of the bodies 16 are being operated upon successively, the device 45—46—48 will have been adjusted for causing the roller 29 to be at the desired elevation for pressing that portion of the belt thereon against the opposed inner periphery of the rotating body 16 with the desired pressure. In the operation of the apparatus, the chuck 12 is rotated in the conventional manner while the belt 17 rotating about the rollers 29—31 is given an endwise excursive movement, first inwardly of the body 16 to its extreme left end and then backwardly to the right for withdrawing the belt endwise from the body. The speed of the belt 17 as well as that of the carriage 13 will be so regulated that by the time one or more predetermined excursive movements have been made the cylindrical surface S will be dressed smoothly and to the desired diameter.

Having thus described the preferred embodiment of the invention, with the view of clearly illustrating the same, I claim:

1. In apparatus utilizable with a mechanism comprising parts capable of relative movement along a line of approach and retraction and for dressing a cylindrical surface of a body while it is supported upon one of said parts and rotated coaxially of such surface about an axis in parallelism with such line of movement; the combination of an arm, means adapted to mount said arm on the other of said parts in a position reaching toward the one thereof, belt-carrying means comprising rollers spaced lengthwise of said arm and of which at least one is mounted on the reaching portion thereof for rotation about an axis transverse thereto, the axial surface elements in the circumferential periphery of said roller being convexly curved, said rollers being adapted to rotatively carry a dressing belt while presenting flights thereof lengthwise of the arm and on opposite sides thereof and said arm mounting means being adapted to adjust said arm laterally within a plane normal to the roller axes, a dressing belt on said rollers, the other of said rollers being adapted to be motor driven for rotating the belt, a driving motor unitarily assembled with said arm mounting means and means drivingly connecting the motor and said other roller.

2. In apparatus utilizable with a mechanism comprising parts capable of relative movement along a line of approach and retraction and for dressing an internal cylindrical surface of an open-ended body while it is supported upon one of said parts and rotated coaxially of such surface about an axis in parallelism with such line of movement; the combination of an arm, means adapted to mount said arm on the other of said parts in a position reaching toward the one thereof, belt-carrying means comprising rollers spaced lengthwise of said arm for rotation about parallel axes transverse thereto and of which at least one is mounted on the reaching portion of such arm, said rollers being disposed to adapt the training of a surface dressing belt thereabout in a fashion that spans of the belt will extend lengthwise of the arm on opposite sides thereof, a dressing belt on said rollers, mounting means at the reaching end of the arm for the one roller, said roller being of the flangeless type and having the axial elements of its circumferential periphery convexly arched with a degree of curvature that extensions of diametrically opposite of such arched surface elements embraces a space wherein said mounting means is entirely confined, and the other of said rollers being adapted to be motor driven for rotating the belt.

3. Surface dressing apparatus comprising a surface-dressing belt of which the strap-like body is transversely bendable, a base, a bearing carried by said base, a drive shaft journaled in said bearing, a driving pulley for said belt and constrained for rotation with said shaft, an arm mounted on said base and reaching therefrom radially of said pulley at a position substantially in axial registration therewith, pulley supporting and journalling means on the reaching end of said arm, a second pulley rotatively carried by said supporting and journalling means to operate complementally with the first pulley in carrying such a surface-dressing belt with its spans therebetween on opposite sides of the arm, and the second pulley having a flangeless circumferential periphery transversely arched at such a curvature that the pulley supporting and journalling means are embraced by continuation extensions of diametrically opposite arched surface elements of such pulley lying within a plane perpendicular to the arm.

CARL W. MOTT.

REFERENCES CITED

The following references are of record in the file of this patent:

UNITED STATES PATENTS

| Number | Name | Date |
|---|---|---|
| 103,191 | Hufeland | May 17, 1870 |
| 110,165 | Smith | Dec. 13, 1870 |
| 1,140,424 | Webb | May 25, 1915 |
| 1,221,798 | Greenamyer | Apr. 3, 1917 |
| 1,570,092 | Smith | Jan. 19, 1926 |
| 1,719,689 | Buehrle | July 2, 1929 |
| 1,735,903 | Johnson | Nov. 19, 1929 |
| 1,773,077 | Newman | Aug. 12, 1930 |
| 1,881,162 | Aurori et al. | Oct. 4, 1932 |
| 1,986,745 | Offutt | Jan. 1, 1935 |
| 2,061,607 | Andrie | Nov. 24, 1936 |
| 2,203,567 | Gilbertson | June 4, 1940 |
| 2,341,442 | Hulbert et al. | Feb. 8, 1944 |
| 2,401,670 | Spetz | June 4, 1946 |

FOREIGN PATENTS

| Number | Country | Date |
|---|---|---|
| 228,862 | Germany | Nov. 25, 1910 |